3,440,769
GEAR GRINDING MACHINE
Kenneth J. Davis, Grosse Pointe, Mich., assignor to National Broach & Machine Company, Detroit, Mich., a corporation of Michigan
Filed Mar. 2, 1966, Ser. No. 531,119
Int. Cl. B24b *17/00*
U.S. Cl. 51—95                                     12 Claims

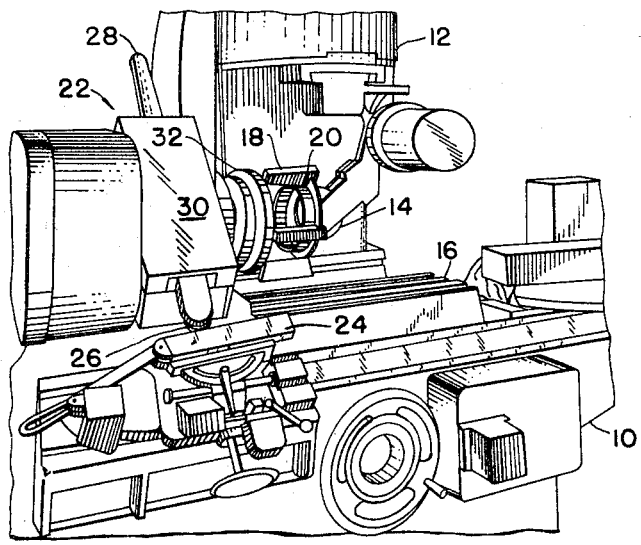
FIG. 1
FIG. 4
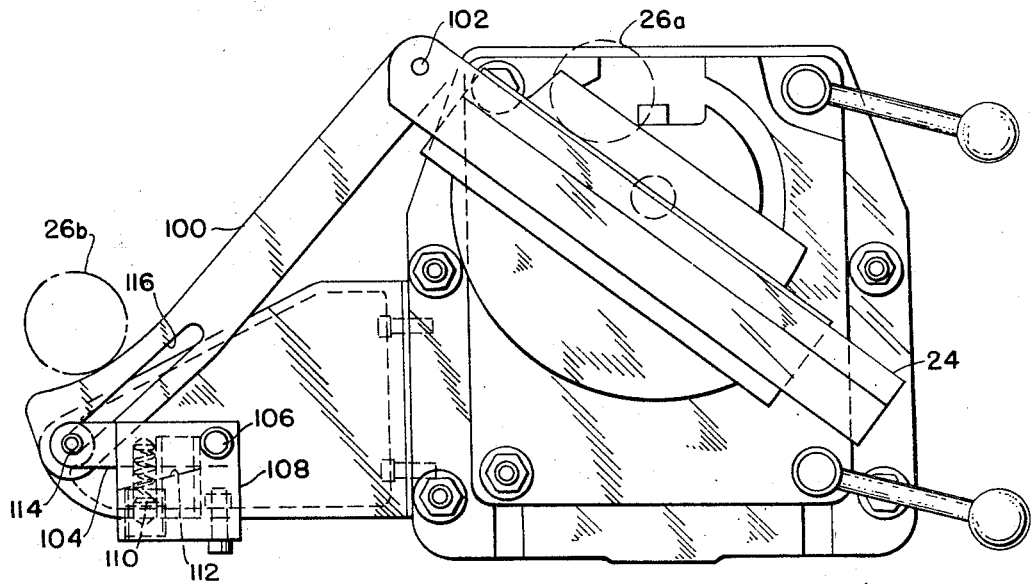
INVENTOR
KENNETH J. DAVIS
BY Whittemore,
Hulbert & Belknap
ATTORNEYS INVENTOR.
KENNETH J. DAVIS
BY Whittemore
Hulbert & Belknap
ATTORNEYS United States Patent Office 3,440,769
Patented Apr. 29, 1969

ABSTRACT OF THE DISCLOSURE

Means for rotating a work spindle to generate or trace helical surfaces on a work piece including a sine bar, a follower connected to the spindle to effect rotation of the spindle in accordance with displacement between the sine bar and follower in a direction parallel to the axis of the spindle. The sine bar is adjustable in a direction perpendicular to the axis of the spindle to effect fine rotary stock-dividing adjustment thereof.

---

It is an object of the present invention to provide a machine for grinding helical gears in combination with a sine bar adjustable to effect rotation of a work gear in accordance with its axial traverse, and provided further with means for effecting bodily movement of the sine bar in a direction generally toward and away from its follower to provide simple means for stock-dividing.

It is a further object of the present invention to provide a sine bar mechanism, a follower engageable with the sine bar and having mechanism associated therewith for effecting rotation of a work spindle in accordance with traverse of a work carriage, and a pivoted lead-in-bar connected to one end of the sine bar and engageable with the follower to control movement of the follower into and out of operative relation to one end of the sine bar.

Other objects and features of the invention will become apparent as the description proceeds, especially when taken in conjunction with the accompanying drawings, illustrating a preferred embodiment of the invention, wherein:

FIGURE 1 is a fragmentary perspective view of a grinder showing the relationship of the sine bar mechanism to the work table and work spindle.

FIGURE 4 is an enlarged fragmentary plan view of a lead-in bar associated with the sine bar.

Figure 2:
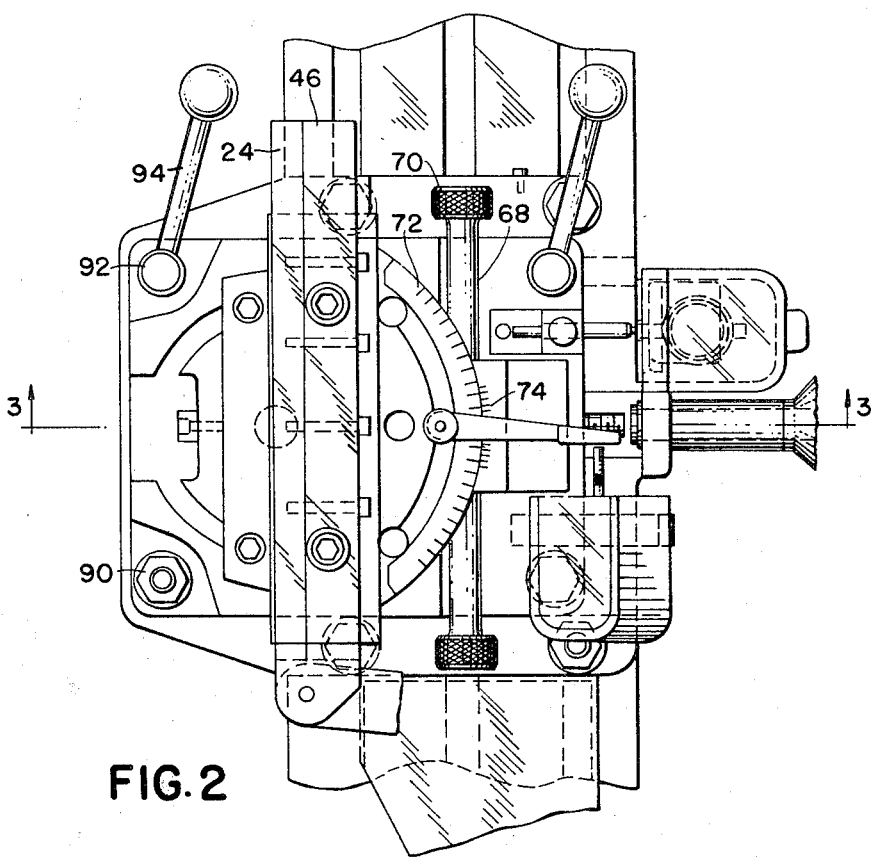
FIGURE 2 is a substantially plan view looking downwardly at an angle of about 45 degrees from the vertical onto the sine bar mechanism.

Referring first to FIGURE 1 the gear grinding machine comprises a frame 10 having a column 12 which includes means for supporting a grinding wheel 14 for angular adjustment about a vertical axis. In the particular machine illustrated the grinding wheel is designed for grinding the teeth of an internal gear but the invention is of course equally applicable to machines for grinding helical gear teeth on external gears. Mounted on the base or frame 10 is a table 16 carrying a fixture 18 for mounting an internal gear 20. The axis of the gear 20 is parallel to longitudinal ways on the frame 10 which support and guide the table 16 for back and forth reciprocation.

Since the gear 20 is a helical gear, it is necessary to effect a rotation of the gear about its axis in timed relation to axial movement thereof provided by reciprocating the table 16. The means for rotating the work gear is the sine bar mechanism indicated generally at 22. This mechanism comprises the sine bar 24 which is engaged by a roller 26 affixed to one end of a bar 28 mounted for longitudinal movement in a guide support 30. The bar 28 is connected to means (not shown) for rotating the work spindle 32. This means as is well understood in the art, may comprise a pinion fixed to the work spindle 32 and rack teeth provided on the bar 28. Preferably however, the connection is to a base roll fixed to the spindle through the medium of opposed flexible tapes each attached at one end to the bar 28 and wrapped partially around the base roll and affixed at the other end to the base roll.

Figure 3:
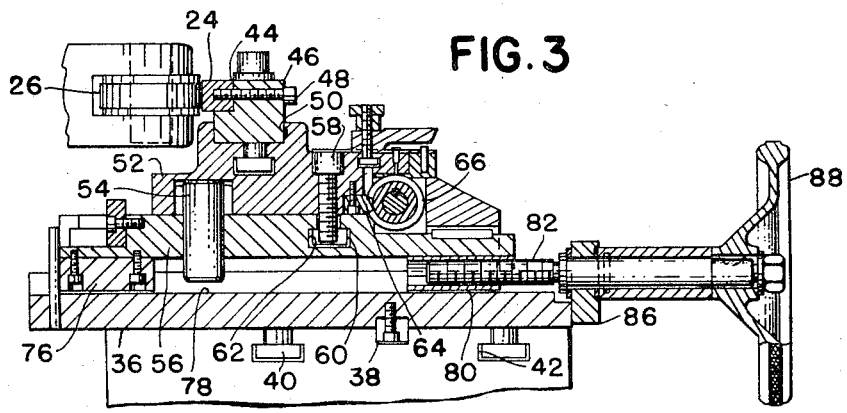
FIGURE 3 is a section on the line 3—3, FIGURE 2.

In order to avoid an excessively long sine bar, the structure illustrated in FIGURES 2 and 3 is provided and comprises a slide 36 adjustable on the base 10 by means of a key 38 and clamping screws 40 received in longitudinally extending T-slots 42. With this arrangement the entire sine bar mechanism may be adjusted transversely on the machine into position adjacent the workpiece headstock which supports the sine bar follower.

The sine bar 24 is received in a groove 44 provided in an elongated block 46 and is retained therein by screws 48. The block 46 is longitudinally adjustable in a channel 50 provided in a swivel mounting member 52, the swivel mounting member being connected by a pivot pin 54 to an intermediate slide 56. The mounting member 52 is provided with fastening bolts 58 associated with nuts 60 received in an arcuate channel 62. In addition, the swivel mounting member 52 has affixed thereto a section of an arcuate rack 64 associated with a worm 66 adapted to be rotated by actuator rods 68 having knurled ends 70. The swivel mounting member 52 is provided with a scale 72 associated with a vernier scale 74 provided on the intermediate slide 56.

It will be apparent that if the sine bar 24 is adjusted into parallelism with the ways on which the work table 16 reciprocates, no motion will be imported to the follower 26 or the follower bar 28. However, if the sine bar 24 is adjusted in either direction from the neutral or zero helix angle position, reciprocation of the table will result in longitudinal movement of the follower bar 28 and corresponding rotation of the work spindle, thus causing portions of the teeth of the gear to move in helical paths.

In the past, considerable difficulty has been encountered in "stock-dividing" the work. This refers to a control of the location of one or both helical surfaces of a tooth space. While conventional grinding is usually performed by grinding one side only of a tooth space, it is possible to provide for simultaneously grinding of both sides of a tooth space and the origin of the expression "stock-dividing" resides in the step of so rotating the work gear relative to the usual index plate associated therewith as to insure equal grinding action at both sides of a tooth space. Obviously, the same considerations control angular adjustment of the work gear to provide for predetermined location, with the index plate locked up with reference to the grinding wheel.

Inasmuch as the rotational position of the work spindle is controlled by longitudinal displacement of the follower bar 28, it is possible to provide an adjustment of the sine bar in addition to its angular adjustment to provide for displacement of the follower and accordingly, a predetermined angular adjustment of the work spindle.

The mechanism for accomplishing this stock-dividing function comprises mounting the intermediate slide 56 for adjustment in a direction generally perpendicular to the length of the sine bar 24 when the sine bar is in neutral or zero helix angle position. This means comprises a key 76 movable in a keyway 78 provided in the slide 36 and a second internally threaded key 80 engaged by a feed screw 82 mounted for rotation but held against axial movement by a bracket 86 fixed to the slide 36 and connected to a hand wheel 88.

Suitable conventional means may be provided for maintaining contact between the roller 26 and the sine bar and this means may take the form of an air cylinder or a spring or the like. Thus, as the hand wheel 88 is rotated, moving the sine bar generally toward or away from the roller 26, the follower bar 28 will be moved longitudinally and will effect a corresponding rotation of the work spindle. The intermediate slide 56 is retained in adjusted position by a pair of lock nuts 90 including flexible pressure applying means so that these lock nuts do not have to be loosened to effect movement of the intermediate slide. Two additional lock nuts 92 are provided each associated with a clamping handle 94. With this arrangement it is necessary only to loosen the lock nuts 92, the lock nuts 90 serving to insure that the intermediate slide 56 is movable but will remain accurately in any position to which it is adjusted.

Referring now to FIGURE 4 there is illustrated a pivoted lead-in bar 100 associated with the sine bar 24. The follower bar 28 which carries the roller 26 has a predetermined range of movement and is adapted to move toward an extended limiting position when the roller carried thereby moves off one end of the sine bar. In order to permit the sine bar engaging roller to move off the sine bar as will normally be required during trimming of the grinding wheel, the lead-in bar 100 provides for means for supporting the roller and follower bar during their outward movement until the follower bar reaches limiting position. As best seen in FIGURE 4, the lead-in bar 100 is provided with a pivot connection 102 with one end of the sine bar 24 and as the work supporting table 16 moves to the left, the follower roller 26 moves from the position indicated in dotted lines at 26a and passes off the left hand end of the sine bar 24 and moves downwardly along the edge of the lead-in bar 100 until the follower bar reaches its outermost position corresponding to the position indicated at 26b for the roller. Thereafter, continued movement of the table 16 causes the roller to occupy the position indicated at 26b with reference to the lead-in bar 100.

Means are provided to eliminate shock as the work table is again moved to the right, bringing the follower roller 26 into contact with the lead-in bar 100. This means comprises an arm 104 which is pivoted as indicated at 106 to a bracket 108 and which is urged to the position shown in FIGURE 4 by means of a compression spring 110. The arm 104 is movable in a slot until an edge thereof engages the bottom wall 112 of the slide. The arm 104 is provided with a pin 114 which extends into an elongated slot 116 provided in the lead-in bar 100. Accordingly, as relative movement between the parts takes place causing the roller 26 to engage the edge of the lead-in bar 100, the bar is permitted to yield against the resilient force applied from the spring 110 through the arm 104, thus eliminating shock from the sensitive and accurate lead control equipment.

The drawings and the foregoing specification constitute a description of the improved gear grinding machine in such full, clear, concise and exact terms as to enable any person skilled in the art to practice the invention, the scope of which is indicated by the appended claims.

What I claim as my invention is:

1. A machine tool for operation on a work piece having a helically extending surface comprising a frame member, a slide member movable on said frame member for back and forth straight line reciprocation, a rotary spindle on one of said members having its axis parallel to the direction of reciprocation of said slide member for mounting the work piece for rotation about its axis, a support on the other member for mounting an element engagable with the helical surface of the workpiece, sine bar mechanism comprising an angularly adjustable sine bar mounted on one of said members having a straight surface inclined to the direction of movement of said slide member and a follower carried by the other of said members and movable along said surface of said sine bar upon reciprocation of said slide member, means connecting said follower to said spindle to impart rotation to said spindle in accordance with reciprocation of said slide member and the inclination of said surface, guide means mounting said sine bar for fine adjustment in a direction transverse to said surface, manually operable means for adjusting said sine bar in a direction transverse to said surface to effect fine stock-dividing rotary adjustment of said spindle, and means for clamping said sine bar in adjusted position.

2. A machine tool as defined in claim 1 in which the angularly adjustable sine bar is mounted on the frame member, and the follower is mounted on the slide member.

3. A machine tool as defined in claim 2 in which the sine bar comprises a first slide adjustable on the frame parallel to the direction of movement of the slide member and an intermediate slide mounted on the first slide for adjustment in a direction generally perpendicular to the direction of movement of the slide member.

4. A machine tool as defined in claim 3 comprising threaded adjustment means extending between the said first slide and said intermediate slide.

5. Sine bar mechanism for a helical gear grinder having a sine bar follower thereon connected to a work spindle, said sine bar mechanism comprising a first slide adjustable on the gear grinder in a direction parallel to the axis of a work gear, an intermediate slide mounted on said first slide for fine adjustment therein in a direction perpendicular to the direction of movement of the first slide, a block pivoted to the intermediate slide for angular adjustment thereon, a sine bar carried by said block for angular adjustment in either direction from an intermediate position in which the sine bar extends generally perpendicular to the direction of adjustment of the intermediate slide on said first slide comprising a lead-in bar pivoted at one end to one end of the sine bar and extending at an angle therefrom to provide support for a sine bar follower after it has passed beyond one end of the sine bar 6. Sine bar mechanism as defined in claim 5 comprising resilient means yieldably supporting the other end of said lead-in bar to prevent shock as the follower comes into engagement with the lead-in bar.

7. Sine bar mechanism comprising an angularly adjustable sine bar, a follower having means thereon engageable with the sine bar and adapted to move beyond one end of the sine bar so as to be unsupported by the sine bar, a lead-in bar pivoted at one end to the sine bar and adapted to be engaged by the follower and extending at an angle to the sine bar so as to provide for controlled outward movement of the follower after it becomes disengaged from the sine bar.

8. Sine bar mechanism as defined in claim 7 comprising a support for the end of said lead-in bar opposite to the end connected to said sine bar.

9. Sine bar mechanism as defined in claim 8 comprising a slotted connection between said lead-in bar and support to provide for automatic poistioning of said lead-in bar as said sine bar is adjusted angularly.

10. Sine bar mechanism as defined in claim 7 comprising yieldable means supporting the lead-in bar for limiting angular movement about its pivot connection with the sine bar to eliminate shock when the follower moves from a position spaced from the lead-in bar into engagement with the lead-in bar.

11. Sine bar mechanism as defined in claim 10, said yieldable means comprising a pivoted arm, a stop for said arm, a pin and slot connection between said arm and said lead-in bar and spring means urging said arm toward said stop in a direction to bias said lead-in bar toward a sine bar follower engaged therewith.

12. Sine bar mechanism for a helical gear grinder having a sine bar follower thereon connected to a work spindle, said sine bar mechanism comprising a first slide adjustable on the gear grinder in a direction parallel to the axis of a work gear, an intermediate slide mounted on said first slide for fine adjustment thereon in a direction perpendicular to the direction of movement of the first slide, a block pivoted to the intermediate slide for angular adjustment thereon, a sine bar carried by said block for angular adjustment in either direction from an intermediate position in which the sine bar extends generally perpendicular to the direction of adjustment of the intermediate slide on said first slide, guide means between said slides, manually operable fine adjustment means connected between said slides to effect fine stock-dividing rotary adjustment of the work spindle connected to said follower without disturbing the angular adjustment of said sine bar.

References Cited

UNITED STATES PATENTS

| | | | |
|---|---|---|---|
| 2,574,111 | 11/1951 | Kopec | 51—95 X |
| 2,585,986 | 2/1952 | Andreasson | 51—100 X |
| 2,672,716 | 3/1954 | Mentley | 51—95 X |
| 2,906,063 | 9/1959 | Board | 51—95 X |

LESTER M. SWINGLE, *Primary Examiner.*

D. G. KELLY, *Assistant Examiner.*

U.S. Cl. X.R.

090—011.62

UNITED STATES PATENT OFFICE
CERTIFICATE OF CORRECTION

Patent No. 3,440,769  Dated April 29, 1969

Inventor(s) Kenneth J. Davis

It is certified that error appears in the above-identified patent and that said Letters Patent are hereby corrected as shown below:

In the specification, column 1, under the title, the statement "Kenneth J. Davis, Grosse Pointe, Mich., assignor to National Broach & Machine Company, Detroit, Mich., a corporation of Michigan" should read --

Kenneth J. Davis, Grosse Pointe, Mich., assignor to Lear Siegler, Inc., Santa Monica, Calif., a corporation of Delawar

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents